(12) United States Patent
Faison

(10) Patent No.: US 6,412,877 B1
(45) Date of Patent: Jul. 2, 2002

(54) DUMP TRUCK TAILGATE APPARATUS OPERABLE AS EITHER A ROTATABLE OR PIVOTABLE GATE

(76) Inventor: Willie F. Faison, 5223 Peppercorn, Durham, NC (US) 27704

( * ) Notice: Subject to any disclaimer, the term of this patent is extended or adjusted under 35 U.S.C. 154(b) by 0 days.

(21) Appl. No.: 09/952,273

(22) Filed: Sep. 12, 2001

(51) Int. Cl.[7] .............................................. B65G 67/24
(52) U.S. Cl. ............................ 298/23 M; 298/23 MD; 298/23 S; 296/51; 296/56; 296/184
(58) Field of Search ........................... 296/51, 56, 184; 298/23 MD, 23 M, 23 S

(56) References Cited

U.S. PATENT DOCUMENTS

| | | | | |
|---|---|---|---|---|
| 2,260,504 A | | 10/1941 | Barrett | 296/51 |
| 2,953,408 A | | 9/1960 | Koenig | 296/28 |
| 3,027,188 A | | 3/1962 | Eichstadt | 296/51 |
| 3,387,406 A | | 6/1968 | Coker et al. | 49/192 |
| 3,544,153 A | * | 12/1970 | Galbreath et al. | 296/106 |
| 3,592,504 A | | 7/1971 | Sandor | 296/50 |
| 3,860,288 A | * | 1/1975 | Martin et al. | 296/56 |
| 3,869,168 A | * | 3/1975 | Matheson | 296/56 |
| 4,068,892 A | * | 1/1978 | Welch | 296/56 |
| 4,076,301 A | * | 2/1978 | Gergoe | 16/232 |
| 4,666,211 A | * | 5/1987 | Smith et al. | 105/370 |
| 4,691,956 A | * | 9/1987 | Hodge | 292/DIG. 29 |
| 4,691,958 A | * | 9/1987 | Miller | 292/262 |
| 4,699,428 A | * | 10/1987 | Vick | 296/184 |
| 4,723,817 A | * | 2/1988 | Wallan | 296/51 |
| 4,751,395 A | * | 6/1988 | Centofanti | 296/56 |
| 4,790,589 A | * | 12/1988 | Moore et al. | 296/50 |
| 5,021,156 A | * | 6/1991 | Sloan | 296/56 |
| 5,288,137 A | * | 2/1994 | Henry | 296/56 |
| 5,335,958 A | * | 8/1994 | Christenson et al. | 296/56 |
| 5,456,520 A | * | 10/1995 | Adams et al. | 296/51 |
| 5,520,443 A | * | 5/1996 | Zanzig | 298/23 M |
| 5,685,594 A | * | 11/1997 | Harper | 296/51 |
| 5,772,389 A | * | 6/1998 | Feller | 296/184 |
| 6,082,800 A | * | 7/2000 | Schambre et al. | 296/50 |
| 6,092,863 A | * | 7/2000 | Hagenbuch et al. | 296/56 |
| 6,131,989 A | * | 10/2000 | Montone et al. | 296/51 |

FOREIGN PATENT DOCUMENTS

GB 2233938 A * 1/1991 ............. B60P/1/26

* cited by examiner

Primary Examiner—Stephen T. Gordon
Assistant Examiner—Lori L Coletta
(74) Attorney, Agent, or Firm—Olive & Olive, P.A.

(57) ABSTRACT

An apparatus for remotely operating a heavy duty tailgate on a heavy-duty dump truck body incorporates a power-assisted mechanism to remotely unlatch the tailgate for unloading of the truck body contents and to remotely latch the tailgate during transit. Another power-assisted mechanism remotely positions the tailgate so that it either pivots about either a horizontal axis or rotates about a vertical axis as desired for unloading of the contents of the truck body. The controls for the power-assisted mechanisms are situated in the cab of the truck so that the driver has full control of the tailgate positioning and dump of the load from within the cab of the dump truck.

6 Claims, 3 Drawing Sheets

DUMP TRUCK TAILGATE APPARATUS OPERABLE AS EITHER A ROTATABLE OR PIVOTABLE GATE

FIELD OF THE INVENTION

This invention relates generally to vehicles having heavy-duty tailgates such as those employed on trucks, towed trailers, and containers used for transporting and discharging bulk materials such as rock, sand, mulch, bark, and the like. The invention, more specifically, relates to apparatus for remotely operating a heavy-duty tailgate on a dump truck as either a tailgate rotatable about a vertical axis at one side of the tailgate or as a power-assisted conventional tailgate pivotal about a horizontal axis along the top of the tailgate.

BACKGROUND OF THE INVENTION

In light duty hauling applications, such as carried out on automobiles of the station wagon style, it has been known to mount a tailgate in such a way that it can be employed as either a manually positioned door or as a manually positioned drop gate. U.S. Pat. No. 3,387,406 to Coker et al; U.S. Pat. No. 3,592,504 to Sandor; and U.S. Pat. No. 4,076,301 to Gergoe exemplify patents which teach manually operated tailgates for automobile station wagons and which are mounted in such a way that the tailgate can manually swing about either a vertical or horizontal axis.

Dump trucks, having conventional tailgates pivoted about a horizontal axis at the top and latched at the bottom, are frequently used for transporting and discharging large debris such as tree stumps, large and heavy rocks, dirt, and sand. However, tailgate apparatus of this kind requires the vehicle operator to leave the cab of the truck and manually unlatch the tailgate each time the dump truck body is to be emptied and manually re-latch the tailgate once the load is discharged.

U.S. Pat. No. 4,691,956 to Hodge; U.S. Pat. No. 3,027,188 to Eichstadt; and U.S. Pat. No. 2,260,504 to Barrett provide dump trucks with tailgates which can be top or bottom hung so that the tailgates may be swung pivotally from the top or bottom as the conditions may require.

U.S. Pat. No. 2,953,408 to Koenig provides a dump truck that permits dumping of the contents of the truck body to either side or to the rear of the dump truck.

More recently, dump trucks are now being equipped with tailgates which are pivoted about a horizontal axis at the top and which also can be opened by rotating about a vertical axis at one side sometimes referred to as the "barn door" type. However, the operator still must leave the cab of the truck and manually unlatch the tailgate each time the dump truck body is to be emptied and manually relatch the tailgate once the dump truck body has been emptied.

With the above background in mind, the present invention has as its primary object that of providing an improved apparatus for operating a tailgate on a dump truck, or the like, which enables the operator with powered assistance to remotely unlatch and position the tailgate for pivoting on a horizontal axis or to allow rotation on a vertical axis. Other objects will become apparent as the description proceeds.

SUMMARY OF THE INVENTION

A dump truck or the like, according to the present invention, utilizes a heavy-duty tailgate which can be opened as referred to above like a "barn door" and can be easily switched back to a conventional tailgate as the need arises. The tailgate can be unlatched, opened, released, closed, and re-latched with time saving efficiency since the operator remains in the cab of his truck and remotely operates the dumping of material from the truck bed. The tailgate is remotely operated by activation of a power-assist mechanism to control rotation about a vertical axis at one end of the tailgate or pivot about a horizontal axis at the top of the tailgate. Provision is also made for power-assisted remote latching of the invention apparatus during transit and power-assisted remote unlatching of the invention apparatus at the site at which the dump truck contents are discharged.

DETAILED DESCRIPTION OF INVENTION

Figure 1:
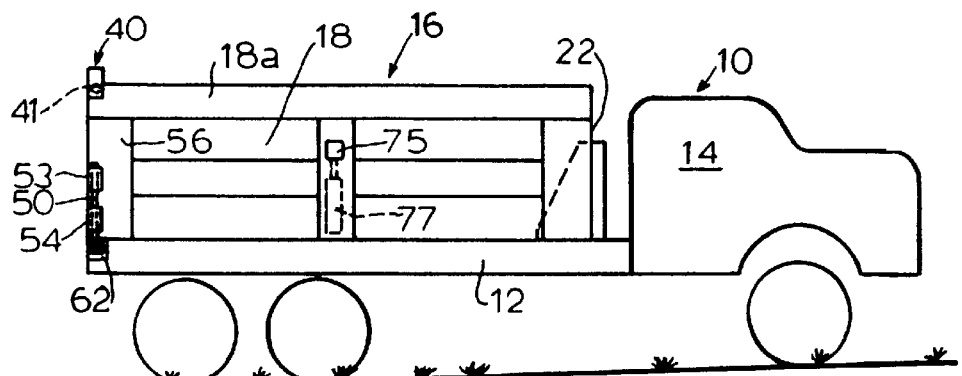
FIG. 1 is a side elevation view of a conventional dump truck embodying the apparatus of the present invention.
Figure 2:
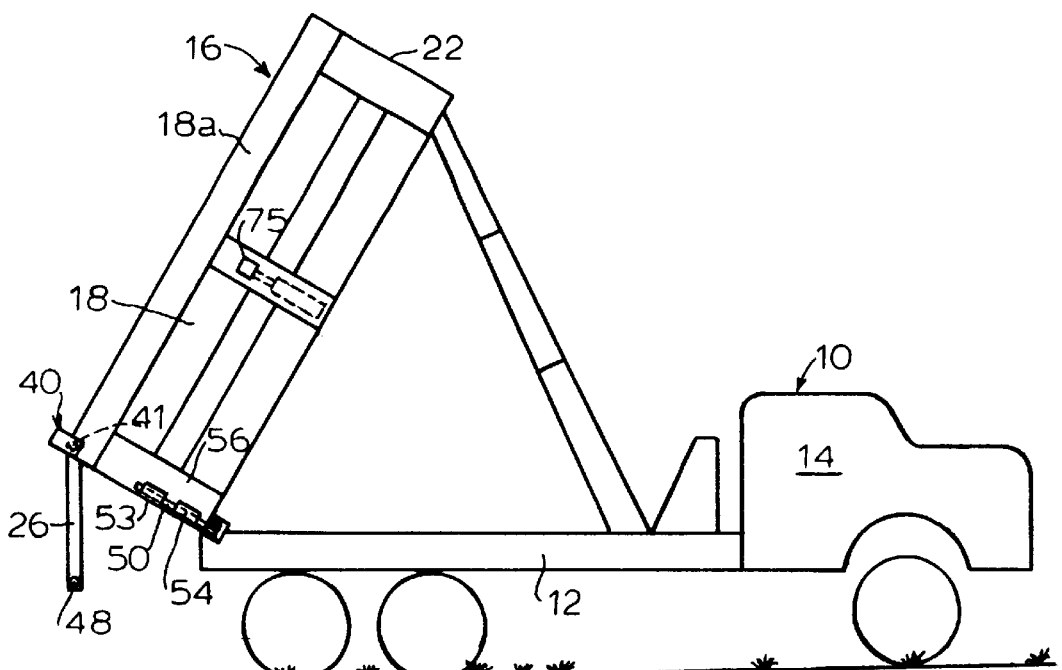
FIG. 2 is a side elevation view of a conventional dump truck of FIG. 1 illustrating the dump truck tilted into a conventional rear dumping position.
Figure 3:
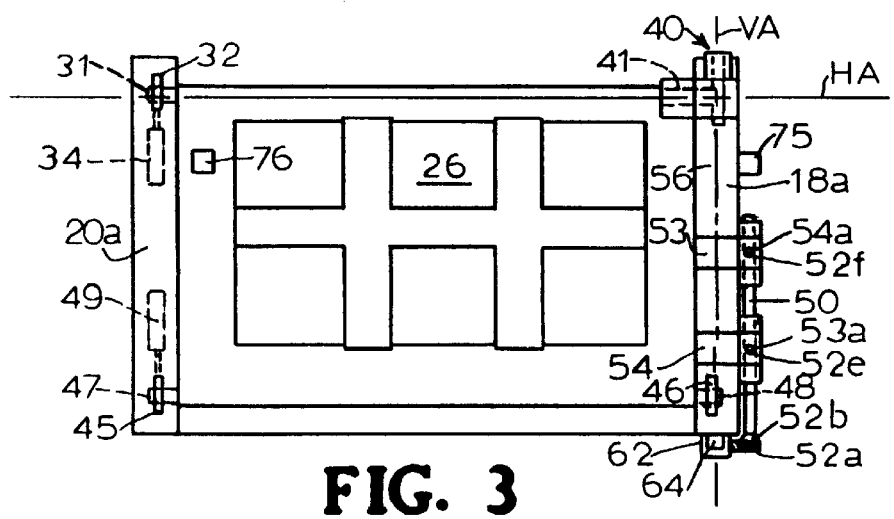
FIG. 3 is an enlarged end view of the rear tailgate area of the dump truck of FIGS. 1 and 2 incorporating the present invention. The tailgate is in a typical tailgate operating mode.
Figure 5:
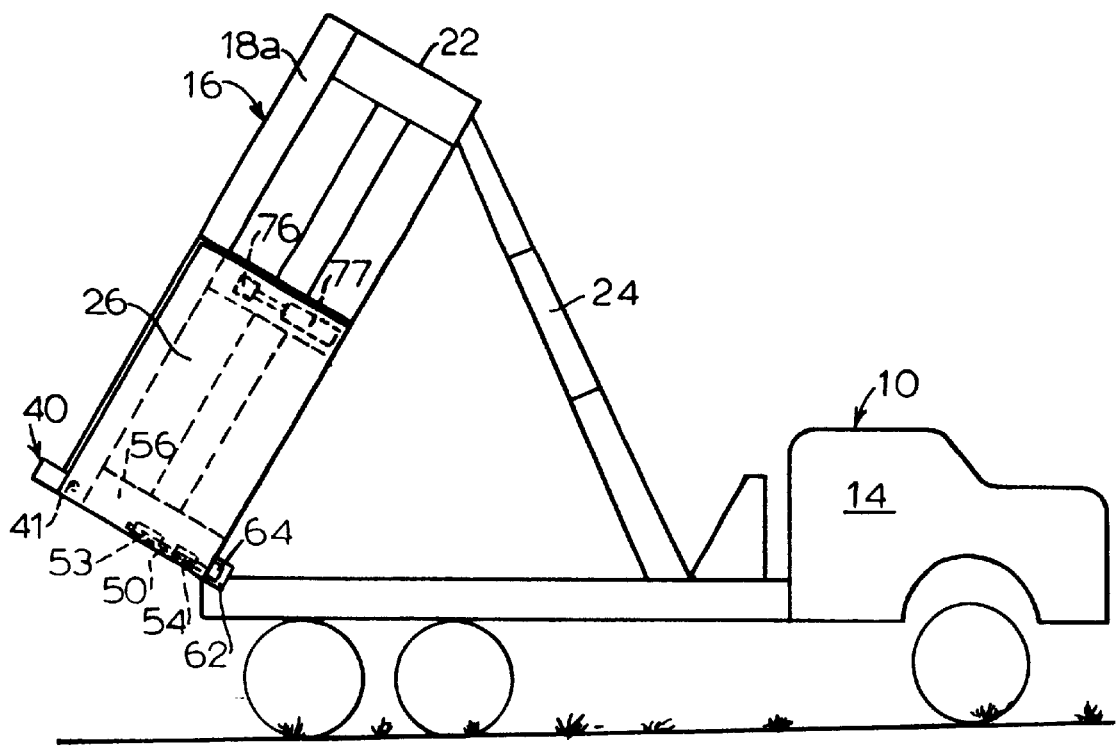
FIG. 5 is a side elevation view similar to that of FIG. 2 illustrating the dump truck tilted into a dump position with the tailgate in the "barn door" mode.
Figure 6:
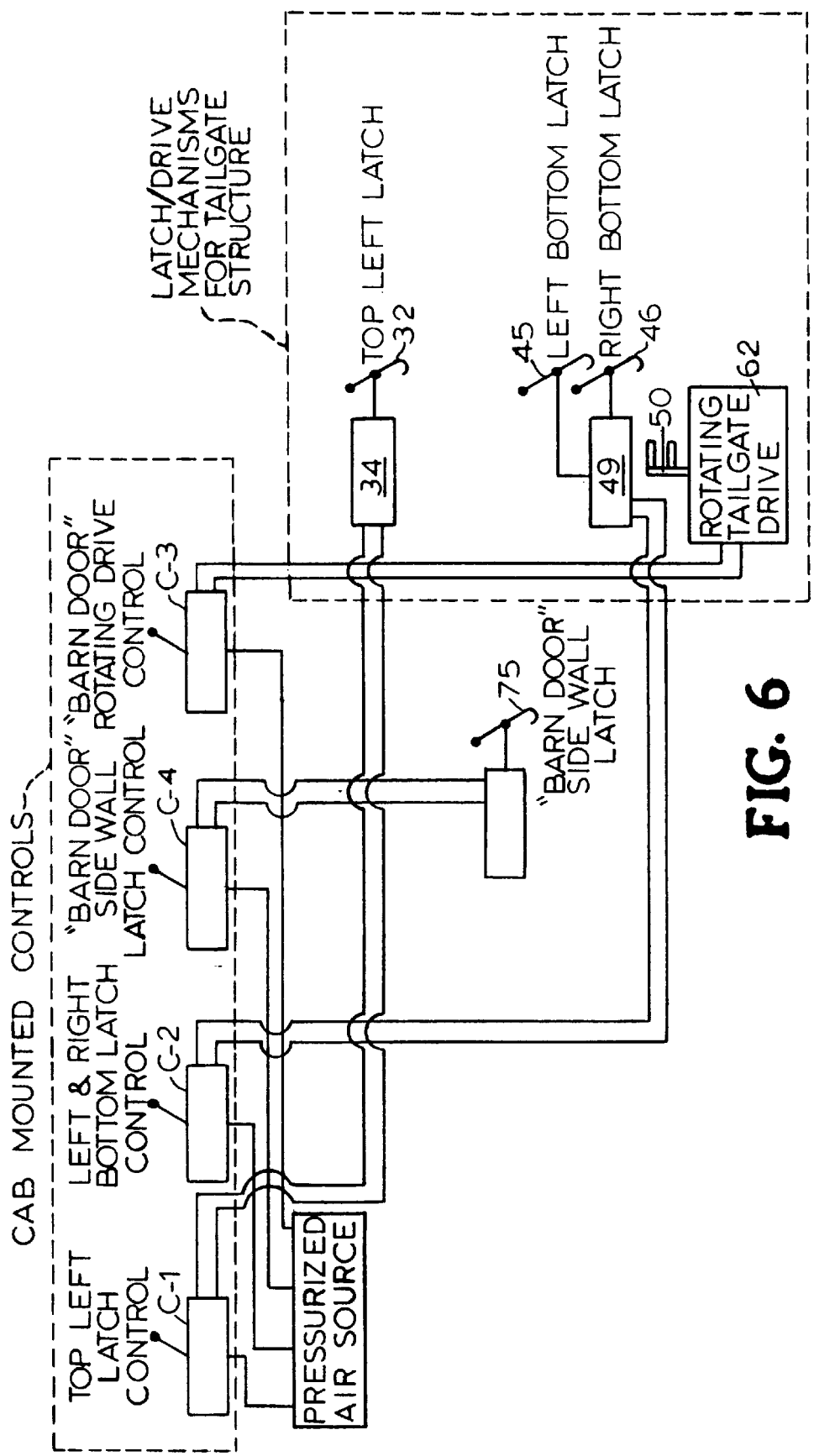
FIG. 6 is a schematic view showing the pneumatic arrangement employed by the present invention.

Referring now to FIG. 1 of the drawings, a conventional dump truck 10 is shown having a chassis or frame 12, a cab 14, a tiltable load or cargo carrying dump body 16 with vertical sides 18, 20 (not shown), and vertical back 22 to form a storage space, and conventional dumping mechanism 24 (FIG. 5). The rear of load carrying dump body 16 is open but the opening is fitted with a heavy-duty, rectangular tailgate 26 (FIGS. 2 and 3) which can be opened to gain access to the cargo or allow the cargo to be removed and which is mounted so that it can be opened as a tilt door which pivots about a horizontal axis "HA" (FIG. 3), or as a "barn door" rotatable about a vertical axis "VA" (FIG. 3). The cargo, to be removed, slides by gravity down the bed of load carrying body 16 of truck 10, when it is in the tilted or elevated position, as shown in FIG. 2, by actuating conventional dumping mechanism 24 which is illustrated in the form of a hydraulic lift mechanism. Activation of dumping mechanism 24 takes place in cab 14 of dump truck 10. Activation does not require the operator to get out of cab 14 of dump truck 10.

First, operation of the subject invention as a pivotal tailgate is best seen in FIGS. 1 and 2. Tailgate 26 is pivotal about horizontal axis HA (FIG. 3). Standing at the back and facing the rear of dump truck 10, tailgate 26 has a top left side pin 31 affixed thereto and pivots with tailgate 26 as it is tilted. Top left side latch 32, mounted in left sidewall rail 20a, is normally closed thus latch 32 holds pin 31 in place while allowing pivoting of tailgate 26 about pin 31. Latch 32 is independently controlled, closed or opened, by use of control C-1 and a pneumatic cylinder 34 and will be discussed further when discussion of tailgate 26 functioning as a "bam door" takes place.

Again, if one is facing the rear of dump truck 10, a two-way hinge 40 is fixedly secured to the top right corner of sidewall rail 18a. Tailgate 26 has a top right side pin 41 affixed thereto which rotates with tailgate 26 as it is pivoted or tilted. Thus, tailgate 26 can pivot at its top outward away from the rear of dump truck 10 (see FIG. 2). Tailgate 26 pivots about horizontal axis HA by pivoting on pins 31 and 41. Two-way hinge 40 will be discussed further when discussion of tailgate 26 functioning as a "barn door" takes place. Tailgate 26 is prevented from constant free swinging about pins 31 and 41 by a pair of normally closed bottom left and right latches 45, 46 respectively. Latch 45 is mounted in the outward lower end of left sidewall rail 20a and receives in a pivoting relationship a pin 47 affixed to the lower left hand end of tailgate 26. Latch 46 is mounted in the outward lower end of right sidewall rail 18a and receives in a pivoting relationship a pin 48 affixed to the lower right hand end of tailgate 26. When latches 32, 45, and 46 are closed, tailgate 26 cannot move and is fixed in a closed position for travel. Latches 45, 46 are controlled by a single pneumatic cylinder 49 which is controlled by control C-2 from within cab 14 of dump truck 10 by the dump truck operator. Latches 45, 46 are normally in a closed position thus holding pins 47, 48 thereby and in turn maintaining tailgate 26 in a closed position. When pneumatic piston 49 is activated by control C-2 from within cab 14 of dump truck 10 by the dump truck operator, then latches 45, 46 are opened thus freeing pins 47, 48. As dump truck 10 is positioned for dumping of its load, latches 45, 46 are released, hydraulic lift mechanism 24 is activated, and dump body 16 is raised or tilted as illustrated in FIG. 2. Activation of hydraulic lift mechanism 24 also takes place from within cab 14 by the operator. Tailgate 26 pivots about axis HA on pins 31, 41 thus allowing the contents of dump body 16 to spill through open tailgate 26. Once dump body 16 is free of its contents, dump body 16 is lowered into a travel mode by hydraulic lift mechanism 24 from within cab 14 of dump truck 10. Once dump body 16 is lowered to its horizontal position, tailgate 26 pivots back into a vertical position and latches 45, 46 are closed. Closing of latches 45, 46 is achieved from within cab 14 of dump truck 10 by the operator activating cylinder 49 by use of control C-2 without having to exit the cab. Tailgate 26 is now closed and dump body 16 is ready for a new load for transport.

Description will now shift to operation of the subject invention for swinging tailgate 26 in a "barn door" type operation. Operation as a "barn door" begins by causing normally closed top left side latch 32 to be unlatched without the necessity of manual manipulation, i.e. the operator getting out of cab 14 of dump truck 10 to release tailgate 26 for dumping. This is accomplished by use of control C-1 and activation of pneumatic cylinder 34, by the operator from within cab 14, to open top left side latch 32. Tailgate 26 is now free at its top left end. Next, pneumatic cylinder 49 is activated by the operator through use of control C-2 from within cab 14 of dump truck 10. The operator is thus able to unlatch and simultaneously release bottom left latches 45 and bottom right latch 46. Pneumatic cylinders 34 and 49 are operated independently of each other through use of controls C-1 and C-2 but from within cab 14. A two-way hinge 40 is fixedly secured to the top right corner of right sidewall rail 18a. Tailgate 26 has a top right pin 41 affixed thereto and rotates with tailgate 26 as it is pivoted or tilted. Two-way hinge 40 thus allows tailgate 26 to open as a "barn door" when tailgate pins 31, 47, and 48 are released from their latched positions.

A hinge shaft 50 (FIG. 3) having a tapered geared sprocket 52 formed with splines 52a at its bottom and a taper 52b at its top inserts into the eyelets of two fixed tailgate hinges 53, 54 that are fixedly attached to right sidewall rail 56 by any suitable means, e.g. welding. Shaft 50 is preferably at least one inch in diameter and should be made of solid steel to ensure rigidity. Two holes (not seen) are drilled into the center of shaft 50 at precise locations of fixed hinge holes or eyelets 53a, 54a simultaneously to ensure the accuracy of each hole and that they are aligned with each other. Two steel pins 52e, 52f preferably of at least 5/16 inch in diameter are inserted into holes 53a, 54a to lock tailgate hinges 53, 54 to shaft 50. This enables tailgate 26 to open as a "barn door" when shaft 50 is being rotated by a powered tailgate drive 62.

Shaft 50 is driven by means of a reversible air motor comprising tailgate drive 62 connected to shaft 50 through a gearbox 64. Gear box 64 is fixedly secured under the right hand corner of right sidewall rail 56 of dump truck 10 by any suitable means. Gearbox 64 may be bolted or welded to right sidewall rail 56 for sturdiness, and has a tapered, splined sprocket (not shown at one end to mate with sprocket 52 on shaft 50. Reversible motor 62 is preferably at least ½ to 1 horsepower to turn shaft 50 and thus rotate tailgate 26. Motor 62 is controlled by control C-3 mounted inside cab 14 of dump truck 10 which makes this operation fully automatic from within cab 14. Motor 62, whether of an electric, hydraulic, or pneumatic type may be used to make this operation fully automatic.

Figure 4:
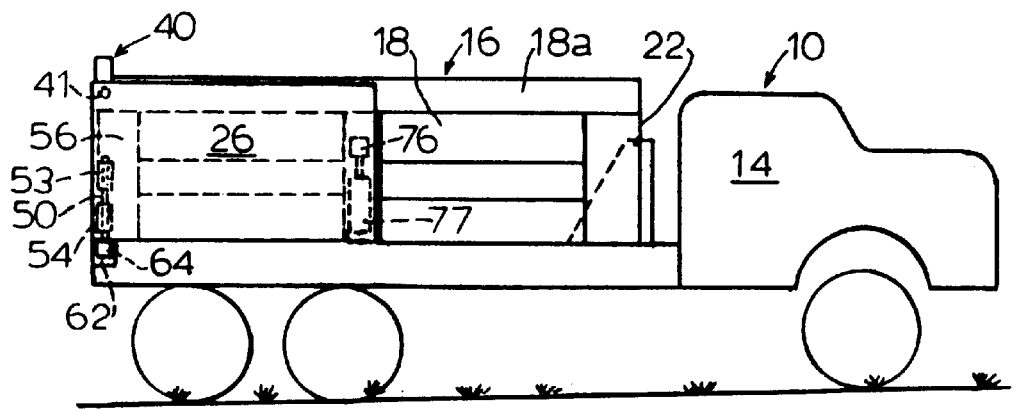
FIG. 4 is an side elevation view similar to that of FIG. 1 but with the tailgate switched into the open "barn door" operating mode.

After tailgate 26 has been rotated back against sidewall 18 of dump body 16 by motor 62, it is latched into position by means of what is referred to as the "Barn Door" sidewall latch 75. Latch 75 which is fixedly secured to sidewall 18 engages a mating latch portion 76 (see FIG. 3) of tailgate 26. Latch 75 is controlled by a pneumatic cylinder 77 which in turn is remotely controlled from within cab 14 by the operator through use of control C-4. Latch 75 and latch portion 76 hold tailgate 26 against sidewall 18 (FIGS. 4 and 5) when tailgate 26 is operated as a "barn door" until closing by deactivating cylinder 77 to release tailgate so that upon activating motor 64, tailgate 26 returns to its closed position. Latches 32, 45 and 46 are closed thus placing truck 10 in readiness for another load transfer.

From the foregoing description, it can be seen that the operator of dump truck 10 is allowed to remain seated in cab 14 of truck 10 and activate the necessary controls to operate tailgate 26 as either a rotatable "barn door" type apparatus or as a tailgate tiltable about a horizontal axis along the top of tailgate 26. The remotely operated apparatus of the present invention is adapted for faster dumping time and thus faster turn-around time to the job site for additional hauling/dumping of loads of material.

While a representative system has been shown, it is recognized that variations in the switches, override switches, controls, or override controls are within the spirit and scope of the present invention. Further, the system may be pneumatic, hydraulic, or electrical and still fall within the scope of the present invention.

What is claimed is:

1. In a vehicle body having a cargo carrying area tiltably connected to said vehicle and bounded by vertical side walls, a bottom wall, a vertical front end wall, and an opening at the rear end of said cargo carrying area;
   (a) a tailgate mounted in said opening;
   (b) a rotatable mount enabling said tailgate to rotate about a vertical axis proximate one end of said tailgate;
   (c) a pivotal mount enabling said tailgate to pivot on a horizontal axis proximate the top of said tailgate;
   (d) a set of latch mechanisms arranged such that selected of said latch mechanisms when open permit said tailgate to pivot about said horizontal axis and other selected of said latch mechanisms when open permit said tailgate to rotate about said vertical axis;

(e) powered operating mechanisms operative to selectively open and close said latch mechanisms;

(f) first control means enabling said operating mechanisms to be controlled from a position remote from the position of said tailgate;

(g) a powered drive operative to power the rotation of said tailgate about said vertical axis;

(h) second control means enabling said powered drive to be controlled from a position remote from said tailgate and powered to rotate said tailgate between a first position in which said tailgate closes said opening and a second position in which said tailgate is positioned against a said side wall in coordination with opening and closing of selected of said latch mechanisms by said operating mechanisms;

(i) an additional latch mechanism for latching said tailgate when in said second position against said side wall;

(j) an additional powered mechanism operative to open and close said additional latch mechanism; and (k) third control means enabling said additional powered mechanism to be controlled from a position remote from the position of said tailgate.

2. In a vehicle body as claimed in claim 1 wherein said powered mechanisms and powered drive comprise pneumatically powered mechanisms.

3. In a vehicle body as claimed in claim 1 wherein said powered mechanisms and powered drive comprise hydraulically powered mechanisms.

4. In a vehicle body as claimed in claim 1 wherein said powered mechanisms and powered drive comprise electrically powered mechanisms.

5. In a vehicle body as claimed in claim 1 wherein said vehicle body comprises a dump body.

6. An apparatus for remotely operating a heavy-duty tailgate on a heavy-duty dump truck body either as a rotatable or pivoting tailgate comprising:

(a) a first power assisted mechanism enabling said tailgate to be unlatched from a latched position for unloading of said truck of its contents;

(b) a second power-assisted mechanism enabling said tailgate to be opened by pivoting about a vertical axis;

(c) a third power assisted mechanism enabling said tailgate to be opened by pivoting about a horizontal axis; and (d) control means enabling said power-assisted mechanisms to be controlled from a position remote from said tailgate.

* * * * *